US005111569A

United States Patent [19]

Ostergaard

[11] Patent Number: 5,111,569

[45] Date of Patent: May 12, 1992

[54] METHOD OF LOCKING AN IMPELLER BAR AGAINST A SEAT

[75] Inventor: David A. Ostergaard, Cedar Rapids, Iowa

[73] Assignee: Cedarapids, Inc., Cedar Rapids, Iowa

[21] Appl. No.: 677,780

[22] Filed: Mar. 29, 1991

Related U.S. Application Data

[62] Division of Ser. No. 440,597, Nov. 22, 1989, Pat. No. 5,004,169.

[51] Int. Cl.[5] .................. B23Q 17/00

[52] U.S. Cl. .................. 29/407; 29/525.1

[58] Field of Search .............. 29/407, 464, 525, 525.1; 241/191, 192, 195, 189 R, 293, 294; 144/174, 230; 407/45, 49, 50; 83/698

[56] References Cited

U.S. PATENT DOCUMENTS 2,747,803 5/1956 Hanse .
3,979,078 9/1976 Boddeker et al. .
4,679,740 7/1987 Orphall .
4,925,114 5/1990 Ostergaard .

FOREIGN PATENT DOCUMENTS 143643 10/1961 U.S.S.R. .

*Primary Examiner*—Timothy V. Eley
*Attorney, Agent, or Firm*—Simmons, Perrine, Albright & Ellwood

[57] ABSTRACT

The rotor of an impact crusher includes a locking mechanism for impeller bars which may vary in thickness. The locking mechanism includes a compound wedging mechanism which generates an initial, axial urging force by tightening a bolt at an accessible location on the rotor. The force is translated to a first wedge through a second wedge to urge the first wedge outward into an outward converging gap between a side wall in a disc of the rotor and the impeller bar to seat the bar. The mean width of the first wedge is adjustable to accommodate impeller bars of various thicknesses. A guide track in the rotor and specifically in discs of an "open" rotor locate the second wedge in relationship to the rotor and independently of the width adjustment of the first wedge to maintain a constant point of force application against the first wedge.

4 Claims, 2 Drawing Sheets

FIG 1
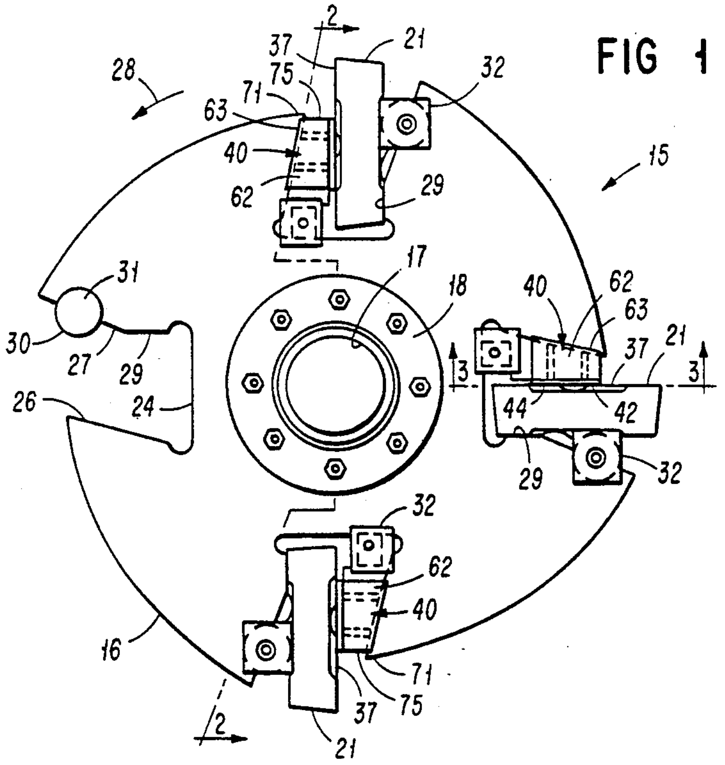
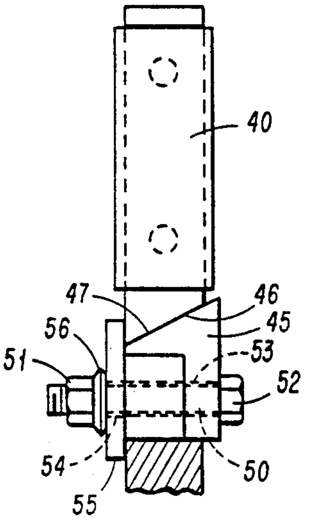
FIG 3
FIG 2
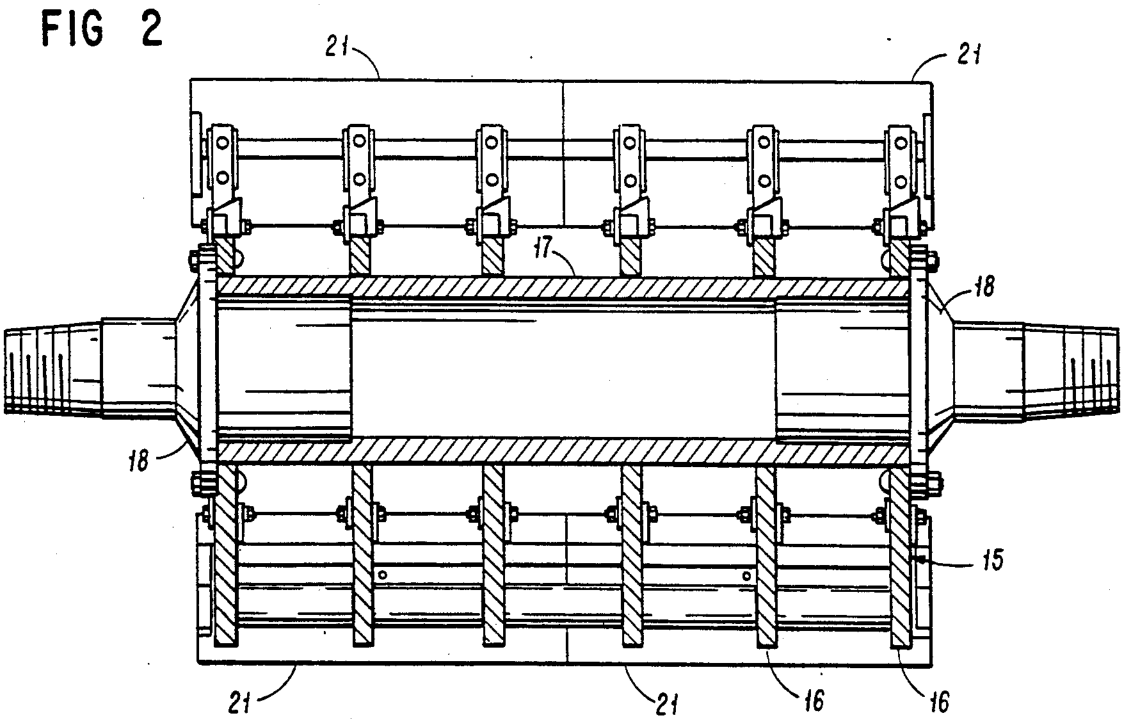

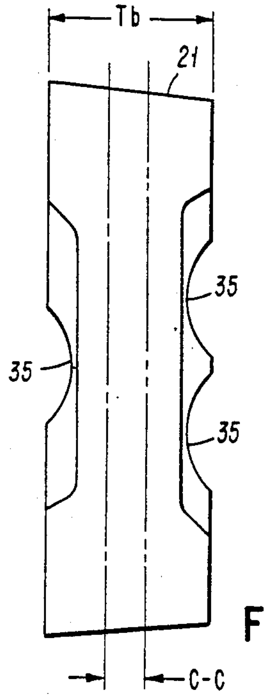
FIG 4
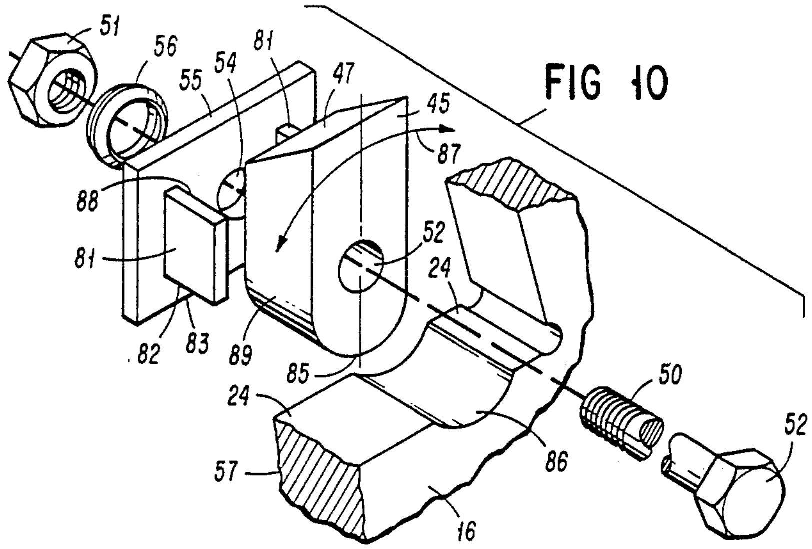
FIG 10
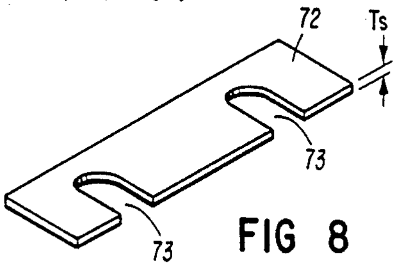
FIG 8
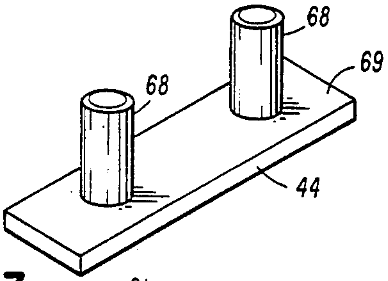
FIG 7
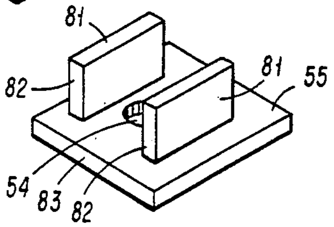
FIG 9
FIG 5
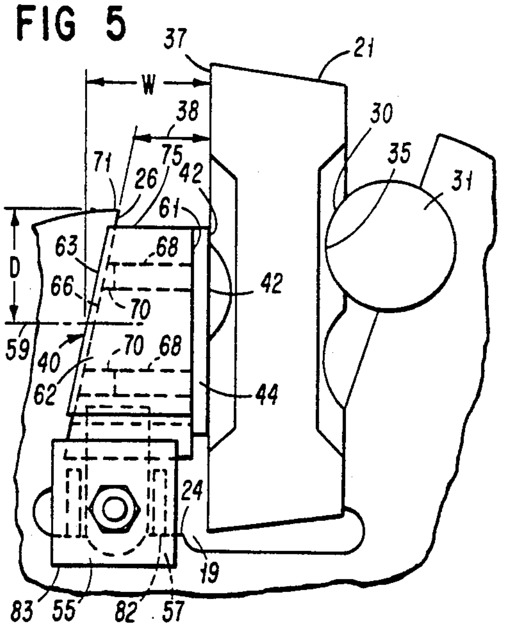
FIG 6
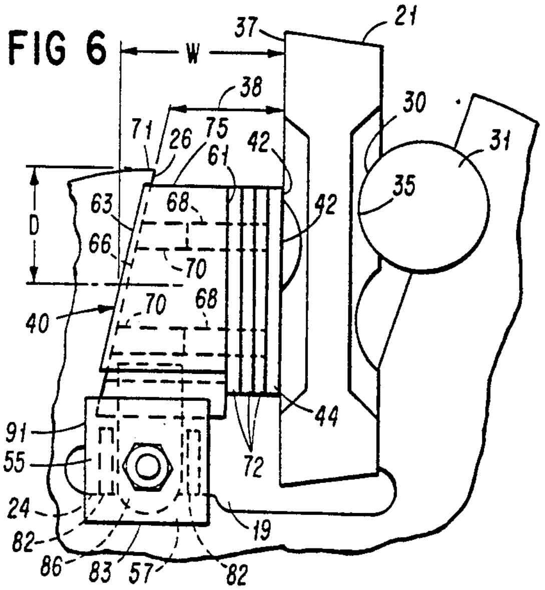

METHOD OF LOCKING AN IMPELLER BAR AGAINST A SEAT

This is a division of copending application, Ser. No. 07/440,597 filed on Nov. 22, 1989 now U.S. Pat. No. 5,004,169.

BACKGROUND OF THE INVENTION

1. Field of the Invention

The invention relates to methods of and apparatus for the comminution or disintegration of solid materials and more particularly to impeller bar installations in impact crushers.

2. Discussion of the Prior Art

Comminution apparatus referred to as "impeller type impact crushers" use impeller rotors having impeller bars which are typically disposed circumferentially and evenly spaced about an axis of a respective rotor to revolve thereabout. During operation of the crushers, the bars are caused to impact with material to be comminuted. A particular use for impeller type impact crushers is, for example, as comminution apparatus for rocks in the production of aggregates for construction materials such as concrete or asphalt materials.

Abrasive characteristics of the materials to be comminuted typically cause substantial wear on impeller bars and on other related machine elements which are exposed to contact by the materials. Also, the impact of hard rock materials with the impeller bars may cause the bars to crack. Ease of replacement and ease of adjustment for wear of impeller bars and their related elements are consequently of constant concern to those engaged in seeking to advance the art of comminuting solid materials.

Securing impeller bars to either "solid" cast type or "open" type rotors appears to be contemplated in most instances with wedges. In implementing arrangements, the interaction of elements of various available structural arrangements varies widely. Various known rotor securing arrangements, while addressing a particular problem of one type or another, fail to address other problems. Other arrangements may suffer from complexity, excessive weight poor accessibility for inspection, adjustment or replacement, the latter being further adversely affected by a condition of "liming," which relates to the build-up of stone fines which adhere to the crusher elements as a tough crust, increasing the difficulty of adjustment or replacement.

Certain problems arise because impact crushers may be used to comminute one type of rock and then be switched to comminute another type of rock, for example upon a shift to another job site at which the available rock material has different characteristics. A contractor may prefer a tough yet not quite as abrasion resistant impeller bar material for use on a certain type of rock to avoid cracking the impeller bars, while a hard material may yield better results for another type of rock. Often, materials offering the least wear or maintenance can be determined only after the comminution work of rock material at a new job has begun and the maintenance intervals are compared with logged historical maintenance data.

A problem which afflicts crushers is that they are specific in their application to handle a certain material and that cumbersome changes may need to be made to a crusher to adapt the crusher to replacement parts which may differ slightly in size from those for which the crusher was originally designed.

SUMMARY OF THE INVENTION

Problems which existed in the prior art are to be minimized or overcome by advantageous features of this invention. A preferred embodiment thereof features an impeller bar installation provision, seating arrangement and locking mechanism to facilitate the installation of impeller bars of different thicknesses. Furthermore, the locking mechanism a preferred embodiment whereof is described in the Detailed Description herein below includes interlocking guide features to facilitate the installation of the impeller bars in accordance with the invention.

According to the invention, an impeller bar assembly in a rotor of an impact crusher includes a rotor frame having a rotor axis and a rotor of predetermined diameter and axial length rotatably disposed about the axis. The rotor frame includes radial recesses evenly spaced about the periphery of the rotor frame for receiving and locating impeller bars to extend radially outward beyond the periphery of the rotor and substantially the axial length of the rotor. The radial recesses have a base and a width with leading and trailing side walls in the direction of rotation of the rotor. The trailing side wall of each such recess supportingly locates a respective one of the impeller bars. The leading side wall converges radially outward with respect to an adjacent opposite surface of the impeller bar, enabling a wedging engagement between the leading side wall and the impeller bar of a first wedge to urge the impeller bar into a seated position against the trailing side wall of the respective recess. A mean width of the first wedge is established equal to a mean gap width between the leading side wall of the recess and the leading surface of the respective impeller bar at a radial depth into the recess, as measured from the periphery of the rotor, greater than one half of the height of the first wedge.

According to a particular aspect of the invention, the first wedge comprises a main body portion having substantially opposite, longitudinally converging first and second surfaces. A support plate having inner and outer support surfaces, adjustably located, adjacent and with said inner support surface facing said first converging surface of the first wedge, for movement perpendicular to said first converging surface. When the support plate is located adjacent the first converging surface, the outer support surface and the second converging surface of the wedge function as outer wedging surfaces of the first wedge. A spacer plate is selectively insertible for changing a mean width between the outer wedging surfaces of the first wedge to equal a mean gap width between the leading side wall of the recess and the leading surface of the respective impeller bar at a radial depth into the recess, as measured from the periphery of the rotor, greater than one half of the height of the first wedge.

According to another particular aspect of the invention the spacer includes a spacer plate having at least one guide structure extending in a direction substantially perpendicular to major, mutually adjacent surfaces of the impeller bar and the first wedge, and the first wedge includes a complementary guide provision to enable the spacer to move in a direction towards and away from the adjacent major surface of the first wedge, when the first wedge is not acted on to engage the impeller bar.

A method of installation of the impeller bar in accordance with the invention includes the steps of adjusting the thickness of the spacer when a mean thickness of the first wedge does not correspond to a mean thickness of the gap width between the leading side wall of the recess and the leading surface of the respective impeller bar at a radial depth measured from the periphery of the rotor into the recess, greater than one half of the height of the first wedge.

A particular advantage of the adjustable locking mechanism in accordance with the invention resides in an ability to accommodate impeller bars of different thicknesses which may be spaced pairwise opposite with respect to each other. Another advantage of the invention is that when abrasive wear has reduced the thickness as well as the height of impeller bars, the effective thickness of a corresponding first wedge may be increased to enable such wedge to lock the corresponding impeller bar into a seated position without the need to raise the first wedge radially into a position wherein portions of the first wedge may become abrasively eroded during the operation of the rotor.

Various other advantages and features of the invention will become apparent from the detailed description of the invention.

BRIEF DESCRIPTION OF THE DRAWINGS

The Detailed Description of the Invention including a detailed description of a preferred embodiment thereof will be best understood when read in reference to the accompanying drawings wherein:

FIG. 1 is an end view of an "open" type rotor of an impact crusher, illustrating the installation of impeller bars including elements of an adjustable locking mechanism according to the invention, one set of bars being omitted for illustrative purposes to depict the configuration of the recesses in the rotor discs.

FIG. 2 is a sectional view of the rotor taken along line 2—2 of FIG. 1.

FIG. 3 is a sectional view taken along the line 3—3 of FIG. 1.

FIG. 4 is a simplified schematic end view of an impeller bar shown separate from its assembly in the rotor illustrating commonality of features of bars of different thicknesses.

FIG. 5 is a simplified partial end view of the rotor showing the installation of an impeller bar of a first thickness and a correspondingly adjusted width of a locking mechanism in accordance with the invention.

FIG. 6 is a simplified partial end view of the rotor similar to that of FIG. 5 showing the installation of an impeller bar of a second thickness and a locking mechanism of a correspondingly altered width with respect to the locking mechanism shown in FIG. 6. FIG. 7 is a pictorial view of a support plate of a first wedge of the adjustable locking mechanism shown in FIG. 1.

FIG. 8 is a pictorial view of a selectively insertible shim-like spacer plate of the adjustable locking mechanism shown in FIG. 1.

FIG. 9 is a pictorial view of an anchor plate of a second wedge of the adjustable locking mechanism. And FIG. 10 is a pictorial exploded view of a second wedge and associated elements showing various cooperative features of a preferred embodiment of the invention.

DETAILED DESCRIPTION OF THE INVENTION

Referring now to FIG. 1, there is shown an end view of a rotor 15 of an impact crusher. The rotor 15 and the crusher (not shown) into which the rotor would be assembled for operation of the crusher are apparatus structures of a type which are generally well known in the art. Herein below are described the combination of elements which distinguish the structure of the rotor 15 and its associated elements over the known art and which also are a elements of a preferred embodiment of the invention. Though features and elements of the described invention may be equally applicable to other types of crushers, particularly with modifications to the elements set forth in the example below, the invention is described particularly with respect to an "open" rotor type impact crusher.

As is typical for "open" type rotors, in reference to FIG. 2, the structure of the rotor 15 includes a number of discs 16 which are spaced in the axial direction of the rotor 15. In the preferred embodiment by which the invention is illustrated, the disks are centered on and welded to a cylindrical tube 17, as is best described in reference to both FIGS. 1 and 2. The discs 16 and the tube 17 constitute a substantially cylindrical main body portion of the rotor 15. The tube 17 is appropriately fitted at each end with a mounting hub 18. The mounting hubs 18 would, in further typical assembly, be rotatably mounted to a respective impact crusher housing (not shown) to allow the discs 16 to rotate along with the tube 17 and hubs 18 about the axis or centerline through the tube 17.

In the preferred embodiment, the discs 16 feature a plurality of recesses 19 which are axially aligned in adjacent discs. The axial alignment of the recesses 19 establishes common recesses 19 axially through the rotor 15. The recesses 19 are, for reasons of achieving conveniently a dynamic balance of the rotor 15, equally spaced about a periphery 20 of the rotor 15. The number of equally spaced recesses 19 about the rotor 15 is of course one of choice. In the described embodiment four such recesses are shown, the equal number of recesses 19 having an advantage of facilitating the installation of oppositely paired impeller bars 21, as further described herein. The recesses 19 are radial recesses, each having a depth defined by the distance from the periphery 20 of each of the discs 16 to an end wall or base 24 adjacent the tube 17. The size and shape of the recesses 19 are equal to each other for obvious reasons, such as dynamic balance of the rotor 15 being one.

Each recess 19 has its width physically defined by a space between a leading side wall 26 sectorially spaced from a trailing side wall 27. The side walls 26 and 27 extend substantially radially such that the lengths of the side walls from the periphery of the discs 16 to the base 24 define the depth of each of the recesses 19. The terms "leading" and "trailing" should be understood to denote relative angular displacement in position with respect to the intended direction of rotation of the rotor 15 as indicated by the arrow 28. Functionally, the width of the recesses 19 is defined as the space needed to locate, seat and lock the impeller bars 21 in the respective recesses 19. A radially inner portion 29 of the trailing side wall 27 adjacent the base 24 defines an inner or lower seating surface 29 for a respective impeller bar 21. A radially outer seat 30 for the respective impeller bar 21 is defined by a cylindrical back-up bar 31 which is welded in the axial direction across all discs 16 such that the leading edge surface 30 of the bar 31 defines the seating surface of the outer seat 30 for the respective impeller bar 21 as part of the general shape of the respective recess 19.

In FIG. 1, an incomplete assemblage of the elements of the rotor 15 is shown for illustrative purposes. In particular, three of the recesses 19 are shown as being occupied by respective, installed impeller bars 21, while the fourth recess 19 is shown without a bar to allow a better description of a preferred shape of the recesses 19. As installed against the trailing side wall 27 of the respective recess 19, the impeller bar 21 is axially restrained by retainer blocks 32 bolted to both ends of the cylindrical back-up bar 31. As shown in FIG. 1 and FIGS. 5 and 6, the installed impeller bar 21 is urged with a radially innermost surface portion 33 of its trailing major side surface 34 against the lower seating surface 29 of the trailing side wall 27.

The positions of the impeller bars 21 in the recesses are determined by the engagement of a depression or radially outer seat 35 with the seating surface 30 on the cylindrical back-up bar 31, as illustrated, for example in the simplified end views of the rotor 15 in FIGS. 5 and 6. When installed or assembled as shown in FIGS. 5 and 6, the impeller bars 21 extend substantially radially within and from the recesses 19 by a certain distance above the periphery 20 of the discs 16. The impeller bars 21 described herein are shown with preferably three of the shallow, axially extending depressions 35, extending the entire length of the respective impeller bar 21 to form what ultimately become in sequence the radially outer seats 35. One of the seats 35 is positioned on the impeller bars 21 to be functional on initial installation of the impeller bars 21 as the seat 35, as shown, for example, in FIG. 1. The remaining two depressions or seats 35 are subsequently engaged, after initial use and wear of the impeller bars 21 necessitates adjustments and relocation of the bars 21. The sequential engagement of the three seats 35 for extending the service life of the impeller bars 21 is, for example, described in applicant's copending application, Ser. No. 07/366,777, filed Jun. 16, 1989, and assigned to the assignee hereof. The advantages of manipulating the impeller bars as described in the referred to specification may of course also be used in conjunction with the features of the current invention. However, the three seats 35 are shown only as relating to and not as being of critical to the current invention. It should therefore be understood that an impeller bar 21 having only a single recess for becoming located and seated is clearly contemplated within the scope and spirit of the current invention.

Furthermore, the shallow depression forming the seat 35 need not be of circular concave sectional shape to correspond to the shape of the cylindrical back-up bar 31. A V-shaped groove to be used in conjunction with the cylindrical back-up bar 31, for example, may be an adequate alternative for the circular section as contemplated in the preferred embodiment. Such a V-shaped groove, however, would preferably have a well-rounded base at the bottom of the V. Such rounding would reduce a risk of stress buildup during rock comminuting impacts from developing into catastrophic failures due to fracture of the impeller bar 21 and separation of the outer end of such a bar. Other means of providing a seat or indexed location for the impeller bar may be available or chosen. The precise type of seat and the manner of seating the impeller bars 21 against the respective trailing side walls of the recesses 19 is not of primary significance to the invention described herein. According to the preferred embodiment, as shown in FIG. 1, the selection of a first one of the seats 35 for engagement with a respective one of the outer seat 30 on the rotor 15 places the trailing major surface 34 of the respective impeller bar 21 with its seat 35 against the back-up bar 31 and the radially innermost surface portion of the impeller bar 21 against the lower seating surface 29 of the recess 19.

A correspondingly leading major surface 37 of the impeller bar 21 is thereby disposed within the recess 19 directly opposite the leading side wall 26 of the recess 19. The leading side wall 26 is inclined from the radial outward direction in the rotationally trailing direction to form a radially outward converging angle with respect to the leading major surface 37. Consequently, the width of a gap 38 between the leading side wall 26 and the leading major surface 37 of the respective impeller bar 21 is not constant but is outwardly decreasing, as best shown in FIGS. 5 and 6. A first wedge 40 is placed into the gap 38, a trailing surface 42 facing the leading surface of the impeller bar 21. The first wedge 40 is urged radially outward to seat and retain the respective impeller bar 21 in its installed position, as shown in FIG. 1, for example. The first wedge 40 includes a main spacer or support plate 44. In the described embodiment, the main spacer or support plate 44 is disposed adjacent the impeller bar 21. The support plate 44 is considered part of the wedge 40 and functions as a bearing or support plate which transmits the desired urging or seating force to the impeller bar 21. Typically, unless the support plate 44 is specifically deleted for reducing the mean width of the wedge 40 below that for which it is designed, the support plate 44 would be present. In that the support plate 44 is part of the first wedge 40, the material thickness of the spacer plate consequently adds to and constitutes part of the overall mean width of the first wedge 40.

FIG. 3 shows in general the manner in which the urging force applied to the first wedge 40 is generated and transmitted from a conveniently accessible side surface of the respective disc 16. A second wedge 45 is positioned for axial movement with respect to the first wedge 40. The first wedge 40 is provided with a third, bottom wedging surface 46 located at its radially innermost end, as engageable in the recess 19. The bottom wedging surface 46 is disposed at an axial incline in a direction radially inward or downward toward an outer or accessible axial end of the rotor 15. The second wedge 45 has an adjacent, complementary, axial upper wedging surface 47 which engages the bottom wedging surface of the first wedge 40. A movement of the second wedge 45 in the axial direction of the rotor 15 toward the inclined bottom wedging surface 46, consequently, urges the first wedge 40 upward or radially outward on the rotor 15 to urge the respective impeller bar 21 into its seated position against the trailing side wall 27 of the recess 19.

The axial movement and associated urging force on the second wedge 45 is generated by an axially disposed threaded element, such as a bolt 50 and a complementary threaded element, such as a corresponding nut 51. In a preferred embodiment the bolt 50 extends from a less accessible side, namely the side of the second wedge 45, with its head 52 bearing against the second wedge, through an axial aperture 53 in the second wedge 45 and through an aperture 54 in an anchor plate 55. The nut 51 is threaded onto the threaded end of the bolt 50 protruding through the anchor plate 55. Preferably, spring washers, such as Belleville washers 56 are interposed into the threaded urging action, such as between the nut 51 and the anchor plate 55 to maintain an urging force axially on the second wedge 45. The axially directed force is supported through the anchor plate 55 bearing against a side surface 57 of the disc 16 and, in general, of the rotor 15. The engagement of the second wedge 45 with the first wedge 40 translates such initially axial force radially outward against the first wedge 40, such that the respective impeller bar 21 is maintained tightly in its seated position. The combination of the first and second wedges 40 and 45 and the generated urging force of the bolt 50, nut 51 and spring washer 56 interact to form a compound wedging arrangement capable of translating an initial, axial urging force to a radial urging force and then to an urging or wedging force in the angular direction of the rotor 15. The compound arrangement for sustaining the wedging force is improved in accordance with the invention as further described herein.

Typically, the impeller bars 21 are selected to have a thickness which represents a compromise or optimization between the weight of the impeller bars and their thickness. In FIG. 2, the impeller bars 21 are shown as extending only to the center of the rotor 15, such that each recess 19 is occupied by two axially adjacent impeller bars 21. Such a division of the impeller bars 21 is deemed necessary for some rotors 15 also because of an all important weight consideration. A thinner, hence, lighter bar is more readily changed or repositioned after a certain amount of wear. On the other hand, a thicker impeller bar 21 contains more material, is stronger and be operated with in the rotor 15 before an adjustment or replacement becomes necessary. At times, it is not possible to assess the abrasiveness of the rocks to be comminuted. Thus, a rotor may include impeller bars of a preselected thickness which are either thicker and heavier than necessary, or which provide an insufficient maintenance interval, such that a thicker bar would provide for less down-time and hence improve the economics of the comminution operation.

For an increase in utility of the rotor 15 and an increased versatility in the comminution operations contemplated therewith, the thicknesses of the impeller bars 21 are preferably adaptable to optimize service periods and costs in relation to a variable environment within which the crushers and corresponding rotors 15 function.

For example, a preferred overall thickness of the impeller bar 21 of four inches, as indicated generally by the dimension "Tb" in FIG. 4, may be desirable for general purpose comminution operations. The material of the impeller bar 21 may be of a high chrome content, generally as high as twenty-five percent, white cast iron. Such "white" cast iron is known to be of greater abrasion resistance than a cast iron not having the high chrome content. In a high abrasion environment, which may be experienced unexpectedly in comminuting rocks at a new job site, an impeller bar of a greater thickness "Tb" may become desirable to maintain the service interval for the rotor 15 at a normal, planned for interval in view of an increased rate of wear of the impeller bars 21. Thus, instead of a typical thickness of four inches of the impeller bars 21, replacement impeller bars 21 may be desirable which have a preferred thickness of five inches.

In another situation, rock encountered at a quarry may be of a type or hardness which has a tendency to chip or crack or otherwise deteriorate the impeller bars of the hard and abrasion resistant white chrome cast iron. Instead of such white cast iron, a different, possibly less abrasion resistant but tougher "cast manganese steel" may be preferred over the more typical high chrome content cast iron. Or, the abrasion characteristics of the rock supply is such, that for ease of replacement and established maintenance intervals, an impeller bar 21 of lesser thickness "Tb" becomes desirable. For example, a three inch thick bar, cast either of such high chrome content white iron, or of the tougher manganese steel, may be desirable.

FIG. 4 identifies the differences between impeller bars of different thicknesses by a change due to an addition or removal of material in the center of the bars 21 between the change lines "C—C". Thus a change in the overall thickness "Tb" would not in any significant manner affect the external features or other overall dimensions of the impeller bars 21.

A preferred embodiment of a rotor 15 has recesses of a width between the leading side wall 26 and the trailing side wall 27 to accommodate a range of thicknesses "Tb" of the impeller bars 21. The installation of an impeller bar 21 at the high end of the thickness range results in a correspondingly lesser gap width between the leading side wall 26 of the respective recess 19 than when an impeller bar 21 of a thickness at the low end of the contemplated thickness range is installed. The first wedge includes features which permit adjustment of the mean width "W", namely the average distance between oppositely facing working surfaces of the first wedge 40, as may be measured substantially at a midpoint of the radially extending height of the respective first wedge 40, as indicated by the centerlines 59 in FIGS. 5 and 6. It should be realized that the shortest one of the such oppositely facing working surfaces, being in the preferred embodiment the length of the support plate 44, is used in determining the location of the respective centerline 59.

An adjustable feature of the first wedge 40 includes the support plate 44 and its adjustability in a direction perpendicularly outward from the plane of an adjacent converging surface 61 of the first wedge 40. In reference to FIG. 5, the first wedge 40 is in itself an assemblage of elements, including in the preferred embodiment at least first and second support elements, namely a main body 62 of the wedge and the support plate 44. A trailing surface of the main body 62 is in the preferred embodiment the surface 61 adjacent the support plate 44. The main body 62 of the first wedge 40 is provided with axial displacement restraints in the form of flanges 63 extending over adjacent edges of the leading side wall 26 of the recess 19. The material thickness of the flanges 63 determines the axial thickness of the body 62 of the first wedge 40 in excess of the thickness of the respective disc 16. The flanges 63 extending over adjacent edges of the leading side wall 26 do not alter the average or mean width of the first wedge 40, in that the disposition of an actively wedging leading surface 66 of the main body 62 of the first wedge 40 is not affected by the extending flanges 63.

Because of the presence of the flanges 63 adjacent the leading surface 66, the preferred location of the support plate 44 is toward the leading surface 37 of the impeller bar 21. It should be realized, however, that other arrangements are possible within the scope of the invention. For example, an equivalent of the support plate 44 may be located against the leading side wall 26 of one of the respective recesses 19. Such a spacer plate may even be provided with flange-like extensions similar to the flanges 63. It would under such arrangement be the main body portion 62 that would be placed in direct contact with the respective leading surface 37 of the impeller bar 21.

The leading surface 66 is radially outwardly converging in relation to its opposite, trailing surface 61. The angle between the mutually converging surfaces 61 and 66 define the working slope or wedging angle of the first wedge 40. Such working slope corresponds to the selected slope of radial convergence between the leading side wall of the recess 26 and the leading surface 37 of the impeller bar 21. Such slope or angle of convergence is of course one of choice, though typically chosen in a range between ten and fifteen degrees. A preferred angle is one of approximately twelve degrees.

Since the support plate 44 is located adjacent or even contiguous to the trailing surface 61, as shown in FIG. 5, the trailing surface 61 is an interior surface, exerting an urging force against the support plate 44. The outwardly facing surface of the support plate 44 urges as the trailing surface 42 of the first wedge 40 the respective impeller bar 21 into its seated position. The support plate 44 in being a functional element of the first wedge 40, is disposed in a pre-established fixed functional position with respect to the body portion 62 of the first wedge.

Referring briefly to FIG. 7, which shows a pictorial view of the support plate 44, the support plate 44 features as a preferred embodiment of a feature of the invention two spaced, dowel-like posts 68 extending in a preferred perpendicular direction from an inner contact surface 69 of the plate 44. The posts 68 are preferably spaced symmetrically about a center of the support plate 44, such that the support plate can be rotated 180 degrees in its major plane without changing the relative position of the plate with respect to the main body 62.

In the assemblage of the support plate 44 and the main body 62, the posts 68 are slidably received as shown in FIG. 5, by complementary apertures 70 extending from the surface 61 through the main body 62 of the first wedge 40. The posts 68 are coincident with the apertures 70 when the inner surface 69 of the support plate 44 is in contact with the adjacent surface 61 of the main body 62. The sliding cooperation between the posts 68 and the apertures 70 supports the desired fixed relationship between the main body 62 and the support plate 44 when the first wedge 40 is engaged to seat the respective impeller bar 21. When the first wedge 40 is moved out of engagement with the impeller bar 21, the support plate 44 is free to move in a direction away from of the converging surface 61 of the main body 62 while maintaining a parallel relationship thereto. Even though the preferred embodiment contemplates a movement substantially perpendicular to the converging surface 61, a sloped, but parallel outward displacement of the support plate 44 with respect to the surface 61 would maintain the intended relationship of the elements. The constrained movement of the support plate 44 relative to the body portion 62 does have a limited range between one limit at which the inner contact surface 69 of the support plate 44 actually contacts the adjacent surface 61. and an outer limit at which the posts 68 leave the guiding constraint of the apertures 70. The actual length of the posts 68 which can be accommodated by the shortest aperture 70 determines the effective range of constraint movement of the support plate 44.

The advantage of the sliding relationship between the main body 62 of the first wedge 40 and its support plate 44 is best explained in reference to FIGS. 5 and 6. In FIG. 6, a substitution of an impeller bar 21 of a lesser thickness than that of the impeller bar 21 shown in FIG. 5 results in a wider gap "W" between the impeller bar 21 and the leading side wall 26 of the recess 19 than the corresponding gap "W" in FIG. 5. Consequently, when the first wedge 40 is located with its midpoint indicated by the centerline 59 at a radial depth "D" from the adjacent peripheral surface 71, the overall mean width of the first wedge 40 needs to be greater in the configuration of FIG. 6 with respect to that of FIG. 5.

The increased mean width of the first wedge 40 is provided for by shims or spacer plates 72 of a preferred configuration as shown in FIG. 8. The preferred configuration shows the spacer plate 72 as being of a planar overall size and shape corresponding to that of the support plate 44. The spacer plate 72 includes laterally open recesses 73 of a size to slide over the posts 68 protruding from the support plate 44. It is of course possible to provide the spacer plates with circular apertures in lieu of the laterally open recesses 73. The advantages of the recesses are in conformance with desired results of the invention, namely the furtherance of versatility of the impeller bar locking features to which the invention relates and the furtherance of serviceability of the rotor 15 and its elements.

Accordingly, the spacer plates 72 are insertible between the surface 61 of the wedge and the support plate 44. The ability of the spacer plates 72 to be readily interposed as described or to be removed from the assemblage of the first wedge 40 poses substantially no risk of accidental loss or removal of the spacer plates 72. There is no relative sliding movement between adjacent surfaces of the support plate 44 and the main body 62 of the first wedge 40 to permit such accidental loss. The spacer plates 72 are consequently securely held, once the plates are inserted.

The change of impeller bars 21 from a thickness "Tb" of four inches to a reduced thickness of three inches, for example, would merely involve spacing the support plate 44 by an additional inch by inserting one or more spacer plates 72 amounting to substantially one inch in thickness. The thickness "Ts", as indicated in FIG. 8, may be chosen to readily accommodate such a change and could, consequently, amount to one inch, thus requiring only a single plate of such thickness. Desirably, to allow for smaller as well as larger adjustments in the mean width of the first wedge, the thickness "Ts" of the spacer plates 72 is of a smaller dimension. A larger change in the mean width "W" of the first wedge 40 requires, consequently, the insertion of several of the spacer plates 72. Such insertion of the spacer plates 72, as shown in FIG. 6, fixes the position of the support plate 44 at the desired distance from the adjacent surface of the main body 62 of the wedge to result in the desired mean width "W" of the first wedge 40.

As an example of the assemblage of the first wedge, in a normal assembly of the rotor 15, the recess 19 may be chosen to have a width such that the overall mean width of the first wedge 40 includes spacer plates 72 amounting in thickness to one inch. The main body 62 has a width to accommodate the length of the posts 68 when the spacers are removed and also facilitates a further one inch expansive movement of the support plate 44 away from the main body 62. With such a preferred assemblage of the first wedge 40 a range of thicknesses of the impeller bars 21 of two inches is possible.

To accommodate a range of thicknesses of the impeller bars 21, consideration should be given to the possibility of assembly imperfections which tend to occur as a result of various factors. For example, a differential shrink rate between the different materials, such as the cast iron and steel impeller bars 21, may cause differences in the ultimate thickness of impeller bars. Such differences may occur when the impeller bars 21 are cast of the referred to cast manganese steel and cast chrome content iron and the same patterns are used. These differences are slight, typically in the order of one-eighth of an inch. In addition, accumulations of imperfections may cause spacing errors which are insignificant in weight distribution but may raise or lower the position of the first wedge 40 to accommodate a slight spacing error. Because of the abrasiveness of the comminuted material, such as rocks, it is highly desirable to protect the first wedges 40 from direct contact with the rocks during the comminution operation. To position the first wedge 40 at a preferred radial height such that an outer end 75 of the first wedge 40 does not protrude above the adjacent peripheral surface 71, an increase in its average width may be desirable. When desirably positioned, the distance from the surface 71 to the centerline 59 is substantially the same or greater than one half of the length of the support plate 44 of the second wedge 40. For lowering the radial position of the second wedge 40 an insertion of additional shim-like spacer plates 72 is contemplated. The thickness of such added spacer plates 72 may be in convenient increments, such as one-eighth of an inch. Furthermore, it may be desirable, though not necessary, that the initial mean width of the body portion 62 of the first wedge is by design less than the nominal design with therefor, such that in any event at least one of the shim-type spacer plates 72 would need to be included in an initial assemblage of the first wedge 40 between the body 62 and the support plate 44.

Many variations of the preferred structure are of course possible. Some of those may not be preferred, but are considered to be within the scope of the invention. For example, it may be deemed desirable to provide two of the support plates 44, each with a thickness different from that of the other, thereby having alternatively usable support plates of two different thicknesses. The disadvantages of such exchangeable support plates include, of course, inventory management problems arising from the added parts which need to be kept available.

Also, variations in the guiding arrangement of the support plate 44 with respect to the main body 62 of the first wedge are possible and may be contemplated as desirable. It may for example be desirable to replace the posts 68 with guide flanges to extend from the longer sides of the support plate 44 along a groove on either side of the main body 62. Such contemplated, alternate guide flanges would lie outside the thickness of the respective discs 16 and could consequently extend past the overall width of the first wedge for a greater range of adjustability.

One preferred embodiment provides for a range of adjustability of approximately only one inch. The support plate 44 has a preferred thickness of three-eighths of an inch, and three thicknesses of shim-type spacer plates 72 are contemplated for possible insertion between the main body 62 and the support plate 44. Preferred thicknesses in the example are one-fourth inch, one-eighth inch and a number fourteen gauge steel sheet material. In all instances, a hot rolled steel is preferred because of the relatively shielded position of the spacer plates 72. In the latter example, the change of thickness of the impeller bars 21 over more than one inch would not be readily accommodated, and any anticipated changes are those resulting from tolerance variations and possible material wear or accummulations occurring in the field.

The described adjustability of the first wedge over a range of thicknesses if further enhanced in functionality by a useful interaction of the previously referred to elements of the second wedge 45 and the combination of the bolt 50 and the anchor plate 55. FIG. 9 depicts details of the anchor plate 55. The plate 55 includes in particular a pair of spaced guide plates or ears 81. The ears are spaced to receive there between the second wedge 45, laterally engaging the width of the second wedge 45 as measured perpendicularly to its axial and radial dimensions. Lower edge surfaces or edges 82 of the ears 81 are spaced upward or offset from a lower edge surface or edge 83 of the anchor plate 55. Thus, when the anchor plate 55 is positioned against the respective side surface 57 of one of the discs 16, the lower edges 82 of the ears come to rest against the base 24 of the recess 19 and permit the anchor plate to overlap the side surface 57 of the disc 16 by a distance determined by the respective offset between the lower edges 82 of the ears and the lower edge 83 of the anchor plate 55.

In reference to FIG. 6 and further to the exploded view of FIG. 10, when the lower edges 83 are located against the base 24 of the recess 19, the aperture 54 in the anchor plate 55 is disposed at a predetermined distance above the base 24 of the respective recess 19 to be in alignment with the aperture 52 extending through the second wedge 45. A lower end 85 of the second wedge 45 has the shape of a cylindrical segment. A complementary concave depression 86 in the base 24 of the recess 19 seats the second wedge 45 to prevent sliding movement upon assembly of the wedge laterally in the plane of the respective disc 16. The shape of the lower end 85 consequently functions as a guide surface which is complemented by the concave depression 86. The concave cylindrical depression 86 functions as a channel in the axial direction of the rotor 15, thereby guiding the second wedge 45 to enable it to advance in the intended axial direction toward the first wedge 40. The cylindrical lower end 85, though guided for unidirectional, axial movement within the depression or channel 86, nevertheless would be free to pivot with sliding movement along the cylindrical surface of the channel 86, as indicated by the arrow 87. Such rotational, pivoting movement is restrained by the ears 81 of the anchor plate 55. The ears 81 bracket the width of the second wedge, when the anchor plate 55 becomes positioned against the disc 16 and the lower surfaces 82 rest on the base 24 of the recess. A reasonable clearance between inner surfaces 88 of the ears 81 and outer surfaces 89 of the second wedge 45 allow for those small excursions which align the respective wedging surfaces between the first and second wedges.

The described features of the locking mechanism supporting the interaction between the anchor plate 55, the second wedge 45, the bolt 50, the channel 86 and the resulting reaction on the first wedge 40 result in several advantages that ma not be readily apparent and need further explanation.

Another significant feature of the ears 81 is the positioning of the lower edge 83 of the anchor plate 55 with a predetermined amount of overlap on the side of the disc 16 below the base 24 of the recess 19. A second advantage of the ears 81 is that a pivotal movement of the anchor plate about the bolt 50 is prevented. A third advantage is that the ears support the anchor plate 55 on the base 24 without a need to hold the plate in place. Another subtle advantage plays a role in distributing forces as the bolt 50 becomes tightened. The ears 81 support a certain torque which tends to pivot the anchor plate forward as the bolt and nut combination exert the urging force between the anchor plate 55 and the second wedge 45. This pivoting force is counteracted by the lower edges 82 of the ears 81 bearing against the base 24 of the recess 19. A further advantage of the ears 81 has already been mentioned, namely that of their function of maintaining the position of the wedge upright during the initial assembly of the locking wedges.

A correlative advantageous interaction between the second wedge 45, the channel 86 and the anchor plate 55 is that the position of the channel not only locates the second wedge 45 along the base 24, but also, because of the bracketing function of the ears 81 for holding the second wedge upright, locates the position of the anchor plate 55 along the base 24 of the recess 19. Preferably the position of the channel is chosen adjacent the leading edge surface 66 of the main body 62 of the first wedge. The anchor plate 55 becomes thus positioned that a leading edge 91 of the anchor plate 55 overlaps an adjacent portion of the respective disc 16 at the root of the leading side wall of the recess 19. This overlap further contributes to the distribution of forces when the bolt 50 and respective nut 51 are tightened. Also, the position of the second wedge 45 in the leading portion of the recess 19 allows trailing portion of the recess to be occupied by impeller bars 21 within a permissible range of thicknesses.

From the above description it should be realized that the specific embodiment described herein is for purposes of an example. Various changes and modifications in the structure of the described embodiment are possible without departing from the spirit and scope of the invention which is sought to be defined by the full scope of the terms of the claims appended hereto and their reasonable equivalents.

What is claimed is:

1. A method of locking an impeller bar against a seat within a recess of a rotor and opposite a wedging side wall of the recess, the impeller bar having a thickness chosen from impeller bars having thicknesses within a known range of thicknesses, the method comprising:

placing the impeller bar against the seat of the rotor;

determining the gap width between the side wall opposite the seat and an adjacent surface of the impeller bar at a radial distance of one-half of the radial height of a wedge inward from the periphery of the rotor;

adjusting the mean width of the wedge to be substantially equal to the determined gap width; and urging the wedge into wedging engagement between the wedging side wall of the recess and the adjacent surface of the impeller bar.

2. A method according to claim 1, wherein the step of adjusting the mean width of the wedge comprises:

moving first and second support elements of the wedge with respect to each other, so as to change the distance between first and second wedging surfaces carried by the first and second support elements, respectively; and changing the number of intervening spacer elements between the first and second support elements to alter the mean width of the wedge to substantially equal the gap width.

3. A method according to claim 1, wherein the wedge is a first wedge and the step of urging the wedge into wedging engagement comprises:

guiding a second wedge for movement axially of the rotor between a pair of guide plates of an anchor plate and along an axial guide track disposed in a base of the recess;

engaging an axially sloped upper surface of the second wedge with a complementarily sloped lower surface of the first wedge with radially outward wedging motion; and urging the first wedge into a radially outward decreasing space between the wedging side wall of the recess and the adjacent surface of the impeller bar.

4. A method according to claim 3, wherein the step of adjusting the mean width of the wedge comprises:

moving first and second support elements of the first wedge with respect to each other, so as to change the distance between first and second wedging surfaces carried by the first and second support elements, respectively; and changing the number of intervening spacer elements between the first and second support elements to alter the mean width of the first wedge to substantially equal the gap width.

* * * * *